(12) United States Patent
Kim et al.

(10) Patent No.: US 9,955,370 B2
(45) Date of Patent: Apr. 24, 2018

(54) METHOD AND APPARATUS FOR CONTROLLING INTERFERENCE IN WIRELESS COMMUNICATION SYSTEM

(71) Applicant: LG ELECTRONICS INC., Seoul (KR)

(72) Inventors: Kijun Kim, Anyang-si (KR); Jaewon Lim, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 267 days.

(21) Appl. No.: 14/136,153

(22) Filed: Dec. 20, 2013

(65) Prior Publication Data

US 2014/0198678 A1    Jul. 17, 2014

Related U.S. Application Data

(60) Provisional application No. 61/751,265, filed on Jan. 11, 2013.

(51) Int. Cl.
| | |
|---|---|
| *H04W 24/06* | (2009.01) |
| *H04L 1/20* | (2006.01) |
| *H04L 5/00* | (2006.01) |
| *H04L 1/00* | (2006.01) |
| *H04L 1/16* | (2006.01) |

(Continued)

(52) U.S. Cl.
CPC ............... *H04W 24/06* (2013.01); *H04L 1/20* (2013.01); *H04L 5/001* (2013.01); *H04L 5/0035* (2013.01); *H04L 5/0053* (2013.01); *H04L 5/0073* (2013.01); *H04L 5/0092* (2013.01); *H04L 1/0031* (2013.01); *H04L 1/1671* (2013.01); *H04L 5/0023* (2013.01); *H04L 5/14* (2013.01); *H04W 72/1278* (2013.01)

(58) Field of Classification Search
CPC ......... H04L 1/20; H04L 5/001; H04L 5/0035; H04L 5/0053; H04L 5/0073; H04L 5/0092; H04L 1/0031; H04L 1/1671; H04L 5/0023; H04L 5/14; H04W 24/06; H04W 72/1278
See application file for complete search history.

(56) References Cited

U.S. PATENT DOCUMENTS

| | | | |
|---|---|---|---|
| 2010/0322227 A1* | 12/2010 | Luo | 370/345 |
| 2011/0105171 A1* | 5/2011 | Luschi et al. | 455/513 |
| 2012/0113812 A1* | 5/2012 | Ji et al. | 370/241 |

(Continued)

*Primary Examiner* — Noel Beharry
*Assistant Examiner* — Nicole King
(74) *Attorney, Agent, or Firm* — Birch, Stewart, Kolasch & Birch, LLP

(57) ABSTRACT

A method and apparatus for controlling interference in a wireless communication system are disclosed. A method for measuring inter-cell interference by a pico eNB in a wireless communication system includes: receiving transmission information of a dummy signal to be transmitted on at least one candidate carrier from a neighbor pico eNB; scheduling at least one user equipment (UE) served by the pico eNB to measure the dummy signal based on the transmission information; receiving a measurement value of the dummy signal from the at least one UE; and transmitting a measurement report of the dummy signal based on the measurement value to the neighbor pico eNB, wherein the dummy signal transmission information is specified for each of a plurality of subframe sets of the at least one candidate carrier.

14 Claims, 10 Drawing Sheets

(51) Int. Cl.
*H04W 72/12* (2009.01)
*H04L 5/14* (2006.01)

(56) References Cited

U.S. PATENT DOCUMENTS

| | | | |
|---|---|---|---|
| 2012/0165029 A1* | 6/2012 | Lindbom | H04L 5/00 |
| | | | 455/450 |
| 2013/0059593 A1* | 3/2013 | Hu | H04L 1/0026 |
| | | | 455/452.1 |
| 2014/0153535 A1* | 6/2014 | Lei | H04L 1/1861 |
| | | | 370/329 |
| 2015/0110024 A1* | 4/2015 | Manssour | H04W 72/1273 |
| | | | 370/329 |
| 2015/0249530 A1* | 9/2015 | Zhang | H04L 5/0058 |
| | | | 370/329 |
| 2015/0264652 A1* | 9/2015 | Zhang | H04W 52/143 |
| | | | 455/522 |

* cited by examiner

FIG. 8

| | SF #n | SF #n+1 | SF #n+2 | SF #n+3 | SF #n+4 | SF #n+5 | SF #n+6 | SF #n+7 | SF #n+8 | SF #n+9 |
|---|---|---|---|---|---|---|---|---|---|---|
| Dummy Signal Transmission | Normal | Dummy | Normal | Normal | Dummy | Normal | Dummy | Normal | Normal | Dummy |
| Dummy Signal Pattern | 0 | 1 | 0 | 0 | 1 | 0 | 0 | 0 | 0 | 1 |

FIG. 9

| | SF #n | SF #n+1 | SF #n+2 | SF #n+3 | SF #n+4 | SF #n+5 | SF #n+6 | SF #n+7 | SF #n+8 | SF #n+9 |
|---|---|---|---|---|---|---|---|---|---|---|
| Macro DL | ABS | ABS | Normal | Normal | Normal | ABS | ABS | Normal | Normal | Normal |
| Dummy Signal (protected =2, non-protected =3) | Normal | Dummy | Normal | Normal | Dummy | Normal | Dummy | Normal | Normal | Dummy |

METHOD AND APPARATUS FOR CONTROLLING INTERFERENCE IN WIRELESS COMMUNICATION SYSTEM

This application claims the benefit of U.S. Provisional Application No. 61/751,265, filed on Jan. 11, 2013, which is hereby incorporated by reference as if fully set forth herein.

BACKGROUND

Field

The present invention relates to a method and apparatus for controlling interference in a wireless communication system.

Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

However, assuming that coordinated scheduling between multiple nodes is not achieved in the multi-node system, advantages of the multi-node system will be reduced due to interference among the multiple nodes. Specifically, the aforementioned problems become more serious in a wireless communication system in which small cells such as a pico cell or a femto cell are distributed. Accordingly, a method for controlling the inter-cell interference under the small-cell environment is needed.

SUMMARY

An object of the present invention is to provide a method for controlling inter-cell interference in a wireless communication system.

The technical problems to be solved by the present invention are not limited to the above technical problems and those skilled in the art may understand other technical problems from the following description.

The objects of the present invention can be achieved by providing a method for measuring inter-cell interference by a pico eNB in a wireless communication system including: receiving transmission information of a dummy signal to be transmitted on at least one candidate carrier from a neighbor pico eNB; scheduling at least one user equipment (UE) served by the pico eNB to measure the dummy signal based on the transmission information of the dummy signal; receiving a measurement value of the dummy signal from the at least one UE; and transmitting a measurement report of the dummy signal based on the measurement value to the neighbor pico eNB, wherein the transmission information is specified for each of a plurality of subframe sets of the at least one candidate carrier.

Preferably, the plurality of subframe sets may include an Almost Blank Subframe (ABS) subframe set and a non-ABS subframe set.

Preferably, the dummy signal may be configured to be more frequently transmitted in the ABS subframe set as compared to the non-ABS subframe set.

Preferably, the transmission information may be determined based on an Almost Blank Subframe (ABS) pattern of a macro eNB.

Preferably, the transmission information may include an identifier (ID) of the at least one candidate carrier.

Preferably, the transmission information may include a bitmap indicating a subframe in which the dummy signal is transmitted or a period per which the dummy signal is transmitted, wherein the period is represented by the number of subframes.

Preferably, the measurement report may include an interference variation value obtained before and after transmission of the dummy signal measured by the at least one UE.

Preferably, the interference variation value may be represented by an equation $$\frac{w \cdot \sum_{k=1}^{n}(CQI_k^0 - CQI_k^1) + \sum_{l=1}^{m}(CQI_l^0 - CQI_l^1)}{n+m},$$

where 'n' is the number of UEs (hereinafter referred to as CRE UEs) connected to the pico eNB according to a Cell Range Extension (CRE) scheme through an Almost Blank Subframe (ABS), 'm' is the number of UEs (hereinafter referred to as non-CRE UEs) connected to the pico eNB according to a general scheme instead of the CRE scheme, $CQI_k^0$ is a CQI index value reported by a CRE UE k to the pico eNB before the dummy signal is transmitted, $CQI_k^1$ is a CQI index value reported by the CRE UE k to the pico eNB after the dummy signal is transmitted, $CQI_l^0$ is a CQI index value reported by a non-CRE UE l to the pico eNB before the dummy signal is transmitted, $CQI_l^1$ is a CQI index value reported by the non-CRE UE l to the pico eNB after the dummy signal is transmitted, and 'w' is a weight.

Preferably, the interference variation value may be represented by an equation $$\frac{w \cdot \sum_{k=1}^{n}(CQI_k^0 - CQI_k^1) + \sum_{l=1}^{m}(CQI_l^0 - CQI_l^1)}{n+m},$$

where 'n' is the number of UEs (hereinafter referred to as PCell UEs) by which the at least one carrier is configured to PCell, 'm' is the number of UEs (hereinafter referred to as SCell UEs) by which the at least one carrier is configured to SCell, $CQI_k^0$ is a CQI index value reported by a PCell UE k to the pico eNB before the dummy signal is transmitted, $CQI_k^1$ is a CQI index value reported by the PCell UE k to the pico eNB after the dummy signal is transmitted, $CQI_l^0$ is a CQI index value reported by a SCell UE l to the pico eNB before the dummy signal is transmitted, $CQI_l^1$ is a CQI index value reported by the SCell UE l to the pico eNB after the dummy signal is transmitted, and 'w' is a weight.

In accordance with another aspect of the present invention, a method for measuring inter-cell interference by a pico eNB in a wireless communication system includes: transmitting transmission information of a dummy signal to be transmitted on at least one candidate carrier to a neighbor pico eNB; transmitting the dummy signal based on the dummy signal transmission information; and receiving a measurement report of the dummy signal from the neighbor pico eNB, wherein the transmission information is specified for each of a plurality of subframe sets of the at least one candidate carrier.

Preferably, the plurality of subframe sets may include an Almost Blank Subframe (ABS) subframe set and a non-ABS subframe set.

Preferably, the dummy signal may be configured to be more frequently transmitted in the ABS subframe set as compared to the non-ABS subframe set.

Preferably, the transmission information may be determined based on an Almost Blank Subframe (ABS) pattern of a macro eNB.

Preferably, the transmission information may include an identifier (ID) of the at least one candidate carrier.

Preferably, the transmission information may include a bitmap indicating a subframe in which the dummy signal is transmitted or a period per which the dummy signal is transmitted, wherein the period is represented by the number of subframes.

Preferably, the measurement report of the dummy signal may include an interference variation value obtained before and after transmission of the dummy signal measured by at least one UE connected to the neighbor pico eNB.

Preferably, the interference variation value may be represented by an equation $$\frac{w \cdot \sum_{k=1}^{n}(CQI_k^0 - CQI_k^1) + \sum_{l=1}^{m}(CQI_l^0 - CQI_l^1)}{n+m},$$

where 'n' is the number of UEs (hereinafter referred to as CRE UEs) connected to the neighbor pico eNB according to a Cell Range Extension (CRE) scheme through an Almost Blank Subframe (ABS), 'm' is the number of UEs (hereinafter referred to as non-CRE UEs) connected to the neighbor pico eNB according to a general scheme instead of the CRE scheme, $CQI_k^0$ is a CQI index value reported by a CRE UE k to the neighbor pico eNB before the dummy signal is transmitted, $CQI_k^1$ is a CQI index value reported by the CRE UE k to the neighbor pico eNB after the dummy signal is transmitted, $CQI_l^0$ is a CQI index value reported by a non-CRE UE l to the neighbor pico eNB before the dummy signal is transmitted, $CQI_l^1$ is a CQI index value reported by the non-CRE UE l to the neighbor pico eNB after the dummy signal is transmitted, and 'w' is a weight.

Preferably, the interference variation value may be represented by an equation $$\frac{w \cdot \sum_{k=1}^{n}(CQI_k^0 - CQI_k^1) + \sum_{l=1}^{m}(CQI_l^0 - CQI_l^1)}{n+m},$$

where 'n' is the number of UEs (hereinafter referred to as PCell UEs) by which the at least one carrier is configured to PCell, 'm' is the number of UEs (hereinafter referred to as SCell UEs) by which the at least one carrier is configured to SCell, $CQI_k^0$ is a CQI index value reported by a PCell UE k to the neighbor pico eNB before the dummy signal is transmitted, $CQI_k^1$ is a CQI index value reported by the PCell UE k to the neighbor pico eNB after the dummy signal is transmitted, $CQI_l^0$ is a CQI index value reported by a SCell UE l to the neighbor pico eNB before the dummy signal is transmitted, $CQI_l^1$ is a CQI index value reported by the SCell UE l to the neighbor pico eNB after the dummy signal is transmitted, and 'w' is a weight.

The above description corresponds to part of embodiments of the present invention and various embodiments reflecting technical characteristics of the present invention are derived and understood by those skilled in the art on the basis of the following detailed description of the present invention.

As is apparent from the above description, exemplary embodiments of the present invention can control inter-cell interference in a wireless communication system.

The effects of the present invention are not limited to the above-described effects and other effects which are not described herein will become apparent to those skilled in the art from the following description.

BRIEF DESCRIPTION OF THE DRAWINGS

The accompanying drawings, which are included to provide a further understanding of the invention, illustrate embodiments of the invention and together with the description serve to explain the principle of the invention.

FIG. 8 is a conceptual diagram illustrating a transmission pattern of a dummy signal according to an embodiment of the present invention.

FIG. 9 is a conceptual diagram illustrating a transmission pattern of a dummy signal according to an aggregate of subframes according to an embodiment of the present invention.

DETAILED DESCRIPTION

Figure 1:
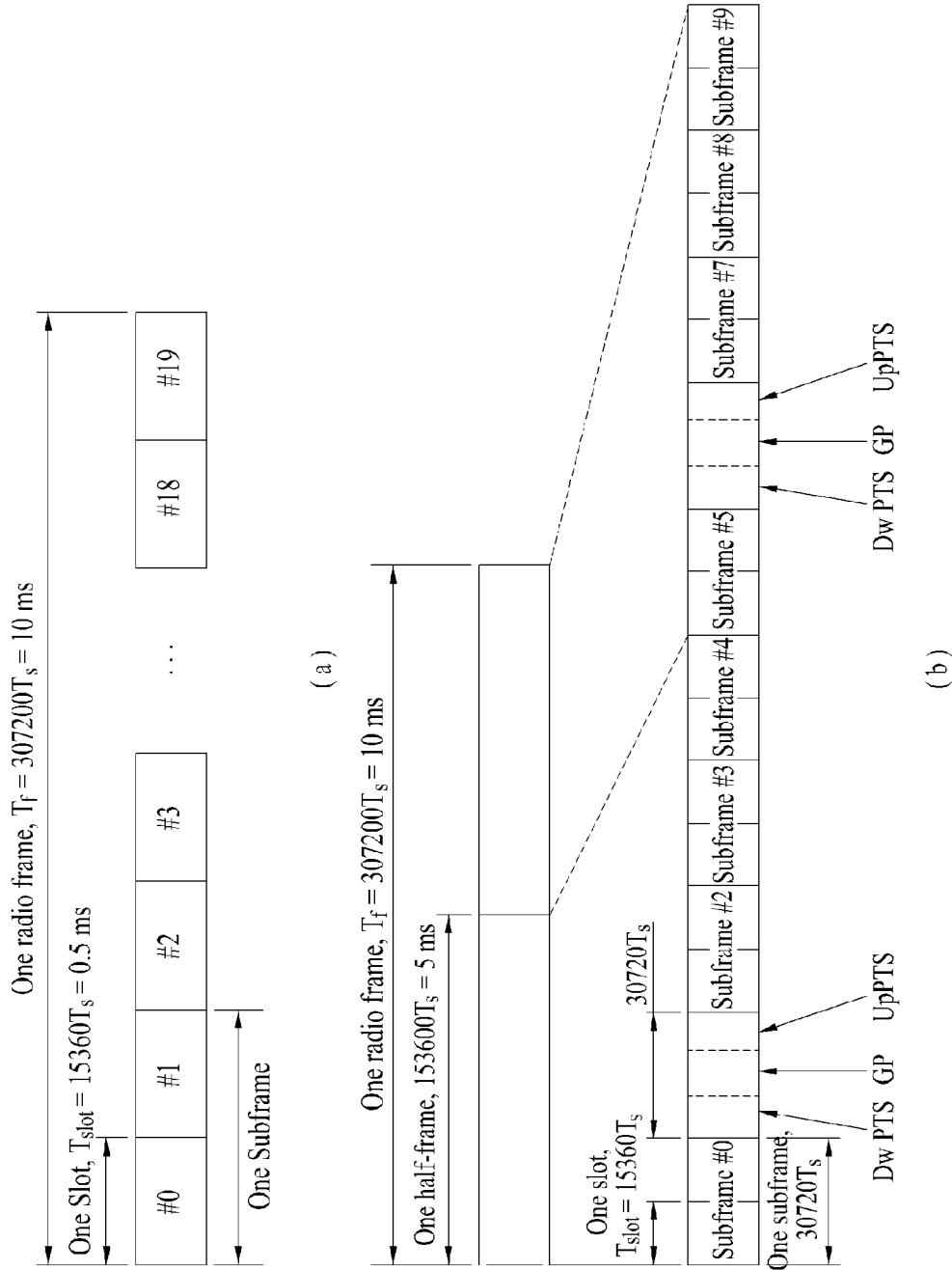
FIG. 1 exemplarily shows a radio frame structure for use in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |

TABLE 1-continued

| DL-UL configuration | Downlink-to-Uplink Switch-point periodicity | \multicolumn{10}{c}{Subframe number} |
|---|---|---|---|---|---|---|---|---|---|---|---|
| | | 0 | 1 | 2 | 3 | 4 | 5 | 6 | 7 | 8 | 9 |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

Figure 2:
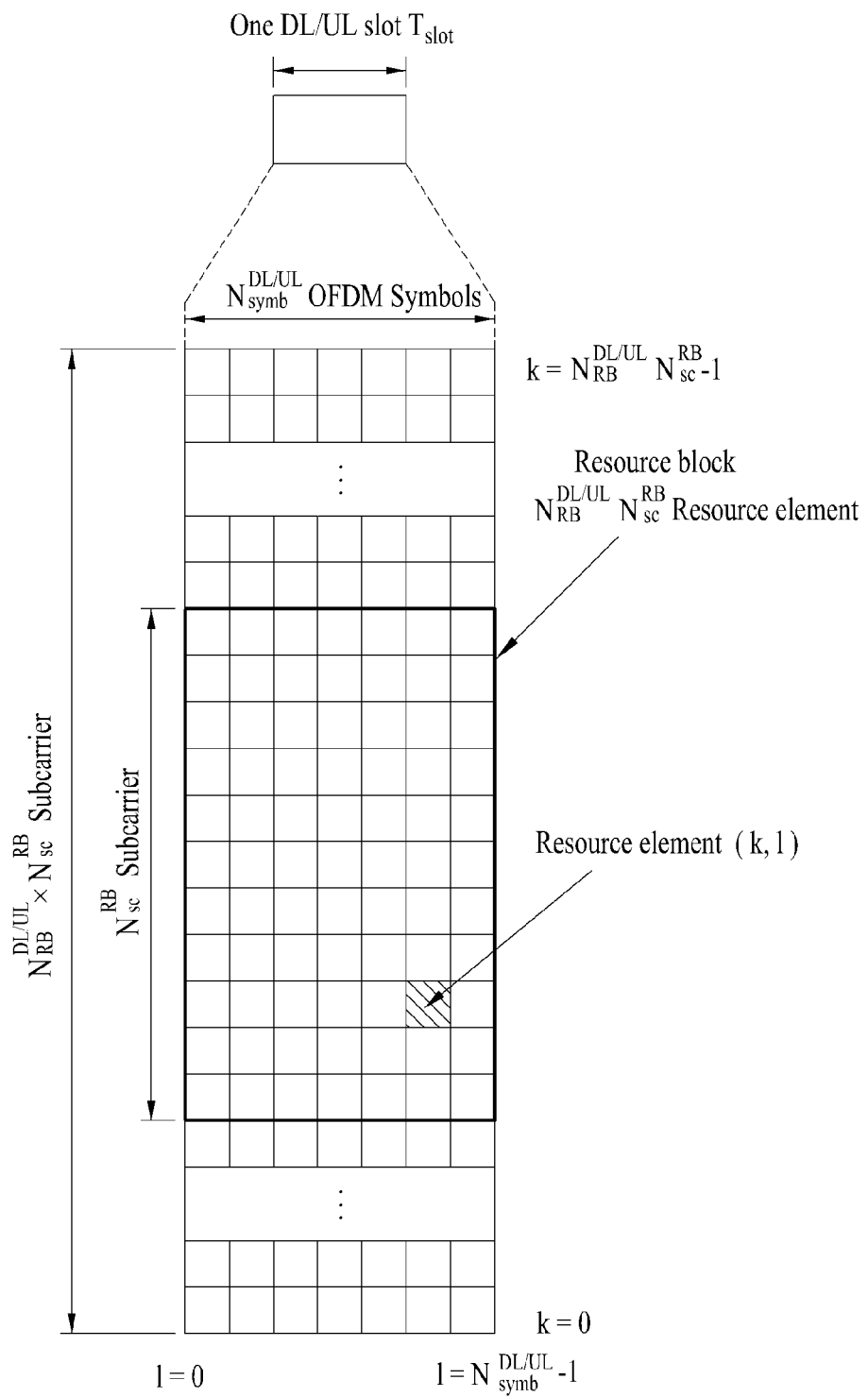
FIG. 2 exemplarily shows a downlink/uplink (DL/UL) slot structure for use in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index).

Figure 3:
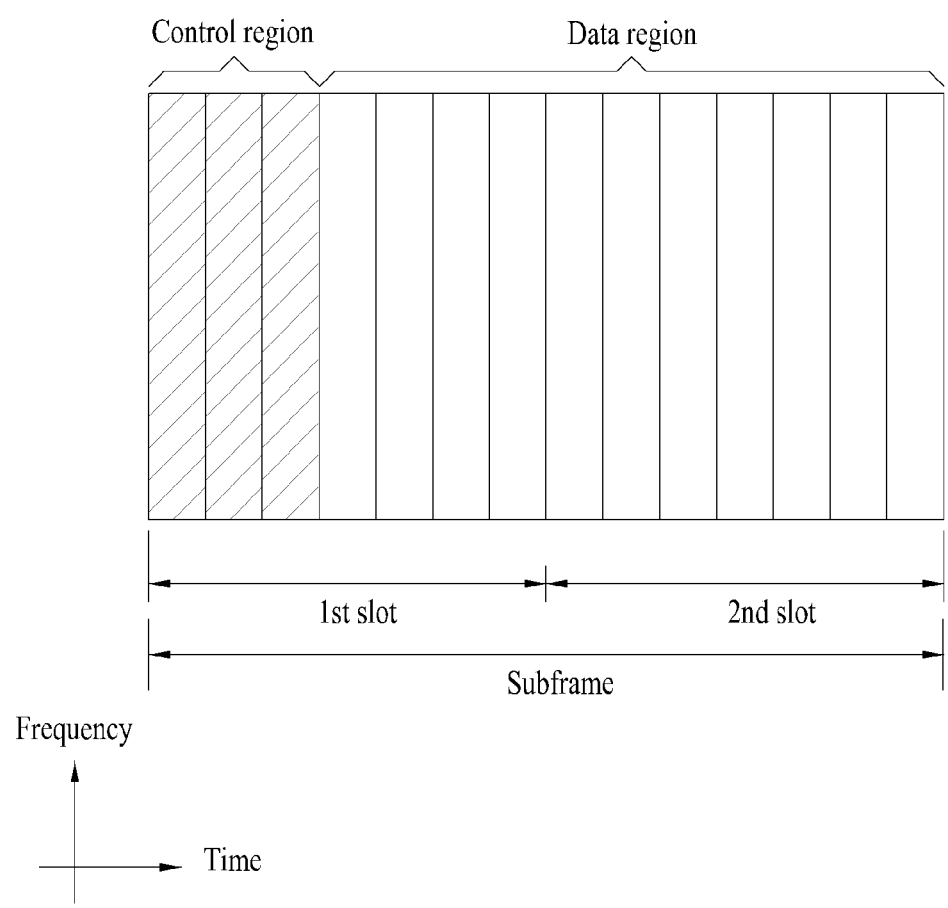
FIG. 3 exemplarily shows a downlink (DL) subframe structure for use in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAT), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
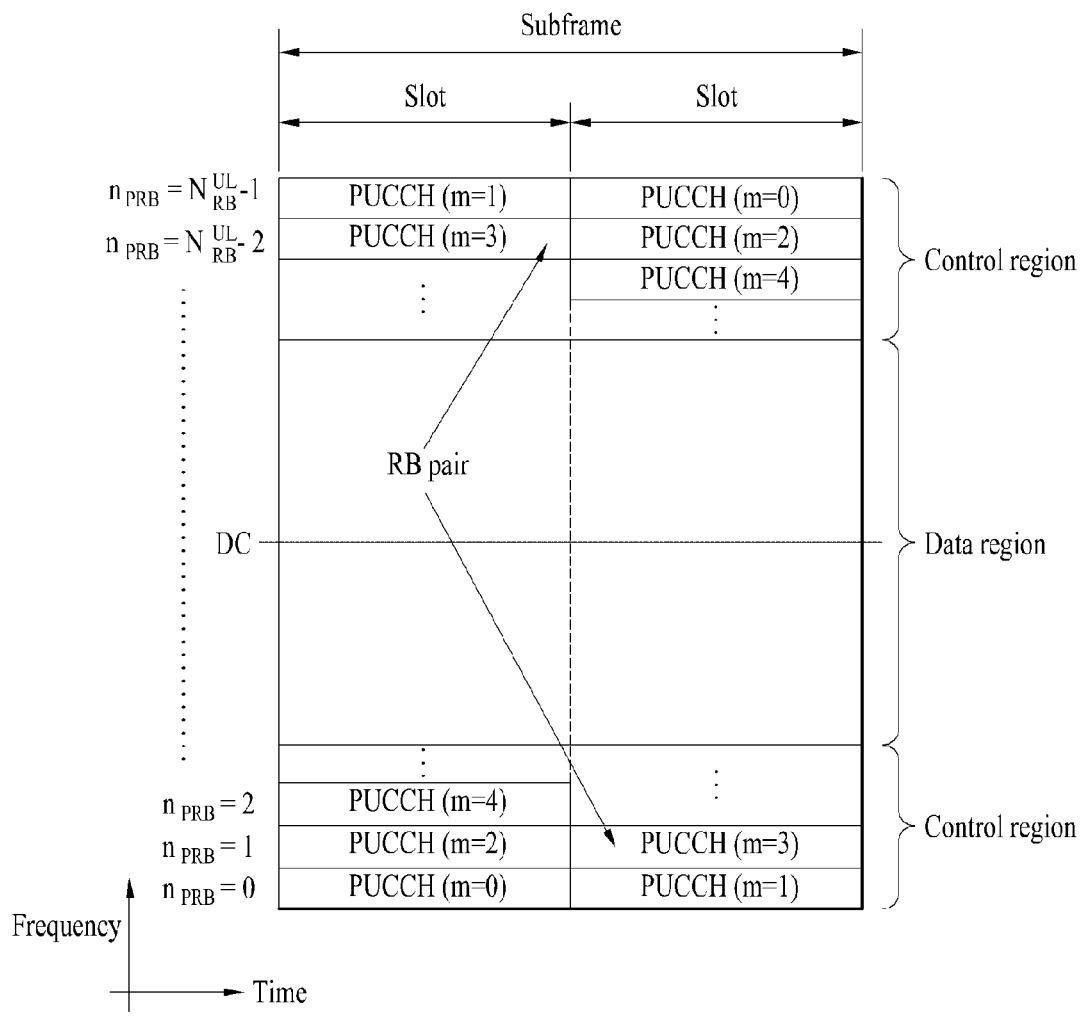
FIG. 4 exemplarily shows an uplink (UL) subframe for use in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data. The control region and the data region may be referred to a PUCCH region and a PUSCH region, respectively. The data region may be allocated a sounding reference signal (SRS). The SRS may be transmitted in the last OFDM symbol in a UL subframe in a time-domain, and a data transmission region, that is a data region of the UL subframe. SRSs for one or more UEs, which are transmitted/received in the last OFDM symbol of the same subframe, may be differentiated based on frequency location/sequence.

If a UE uses SC-FDMA scheme for uplink transmission in a LTE system according to 3GPP LTE release 8 or 9, a PUCCH and a PUSCH may not be transmitted simultaneously in a carrier in order to maintain a characteristic of a single carrier. In a LTE system according to 3GPP LTE release 10, whether or not simultaneous transmission of a PUCCH and a PUSCH is available may be indicated by a higher-layer.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.
 HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 2 shows the mapping relationship between PUCCH formats and UCI in LTE/LTE-A.

TABLE 2

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 2 PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Carrier Aggregation

Figure 5:
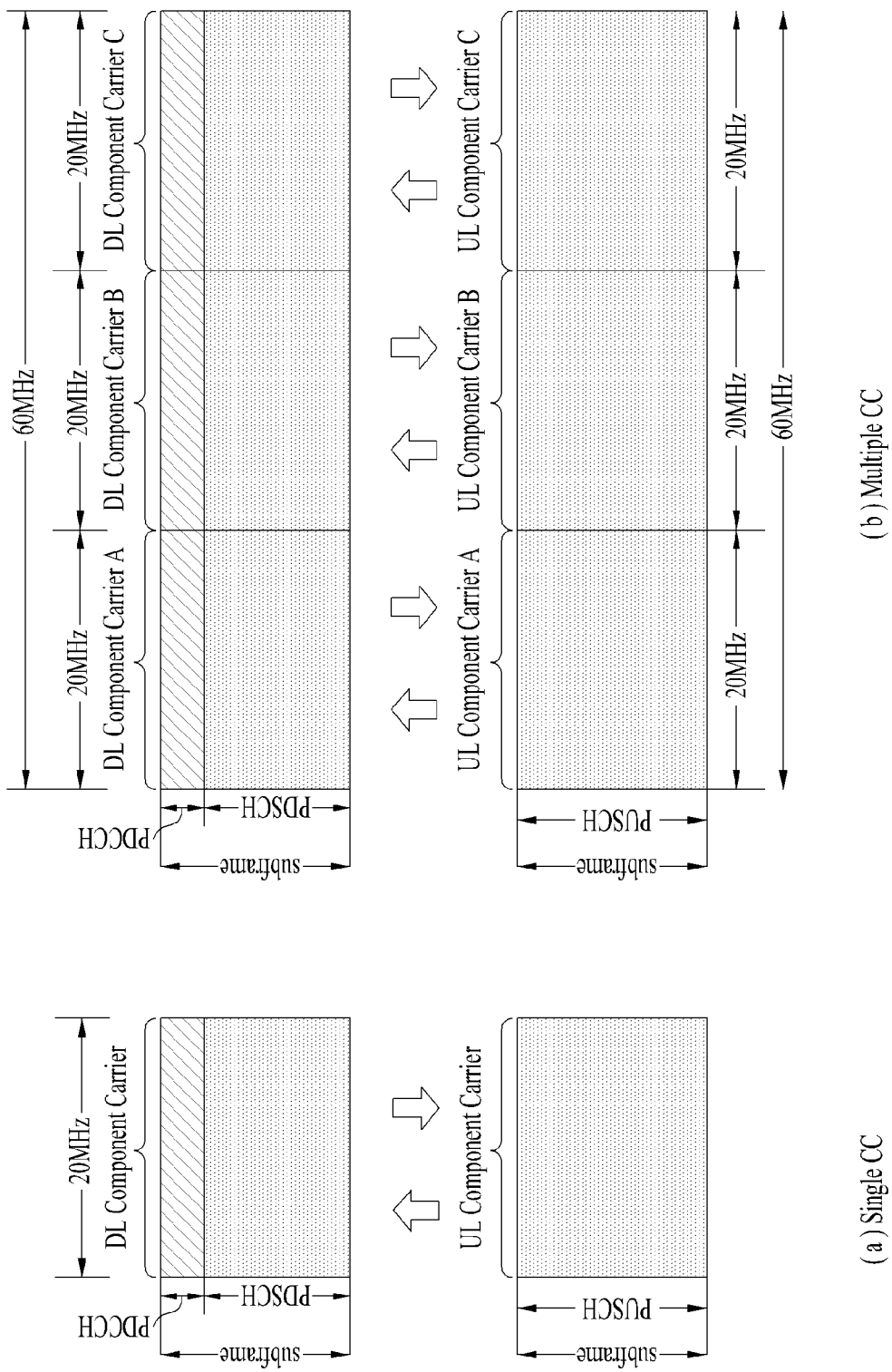
FIG. 5 is a conceptual diagram illustrating a carrier aggregation (CA) scheme.

FIG. 5 is a diagram illustrating carrier aggregation (CA). The concept of a cell, which is introduced to manage radio resources in LTE-A is described prior to the CA. A cell may be regarded as a combination of downlink resources and uplink resources. The uplink resources are not essential elements, and thus the cell may be composed of the downlink resources only or both the downlink resources and uplink resources. This is defined in LTE-A release 10, and the cell may be composed of the uplink resources only. The downlink resources may be referred to as downlink component carriers and the uplink resources may be referred to as uplink component carriers. A downlink component carrier (DL CC) and a uplink component carrier (UL CC) may be represented by carrier frequencies. A carrier frequency means a center frequency in a cell.

Cells may be divided into a primary cell (PCell) operating at a primary frequency and a secondary cell (SCell) operating at a secondary frequency. The PCell and SCell may be collectively referred to as serving cells. The PCell may be designated during an initial connection establishment, connection re-establishment or handover procedure of a UE. That is, the PCell may be regarded as a main cell relating to control in a CA environment. A UE may be allocated a PUCCH and transmit the PUCCH in the PCell thereof. The SCell may be configured after radio resource control (RRC) connection establishment and used to provide additional radio resources. Serving cells other than the PCell in a CA environment may be regarded as SCells. For a UE in an RRC_connected state for which CA is not established or a UE that does not support CA, only one serving cell composed of the PCell is present. For a UE in the RRC-connected state for which CA is established, one or more serving cells are present and the serving cells include a PCell and SCells. For a UE that supports CA, a network may configure one or more SCells in addition to a PCell initially configured during connection establishment after initial security activation is initiated.

CA is described with reference to FIG. 5. CA is a technology introduced to use a wider band to meet demands for a high transmission rate. CA can be defined as aggregation of two or more component carriers (CCs) having different carrier frequencies. FIG. 5(a) shows a subframe when a conventional LTE system uses a single CC and FIG. 5(b) shows a subframe when CA is used. In FIG. 5(b), 3 CCs each having 20 MHz are used to support a bandwidth of 60 MHz. The CCs may be contiguous or non-contiguous.

A UE may simultaneously receive and monitor downlink data through a plurality of DL CCs. Linkage between a DL CC and a UL CC may be indicated by system information. DL CC/UL CC linkage may be fixed to a system or semi-statically configured. Even when a system bandwidth is configured of N CCs, a frequency bandwidth that can be monitored/received by a specific UE may be limited to M (<N) CCs. Various parameters for CA may be configured cell-specifically, UE group-specifically, or UE-specifically.

Figure 6:
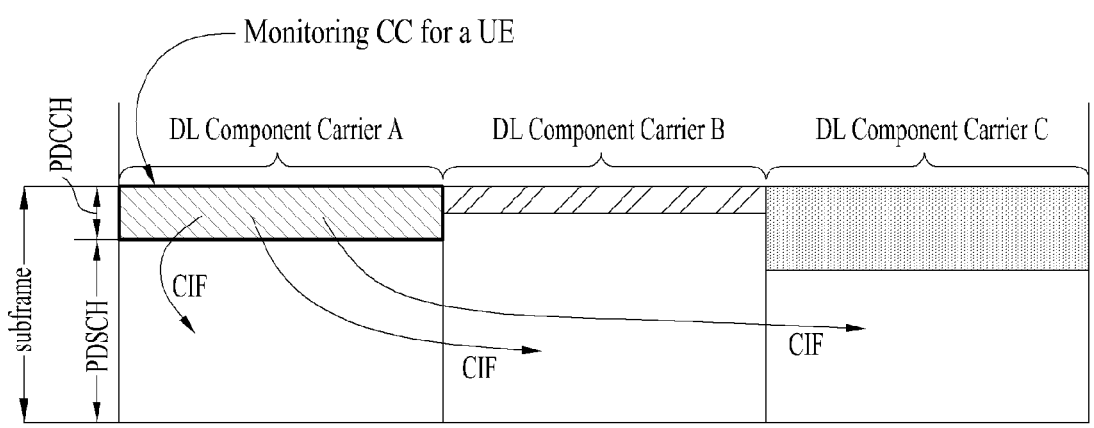
FIG. 6 is a conceptual diagram illustrating a cross-carrier scheduling scheme.

FIG. 6 is a diagram illustrating cross-carrier scheduling. Cross carrier scheduling is a scheme by which a control region of one of DL CCs of a plurality of serving cells includes downlink scheduling allocation information the other DL CCs or a scheme by which a control region of one of DL CCs of a plurality of serving cells includes uplink scheduling grant information about a plurality of UL CCs linked with the DL CC.

A carrier indicator field (CIF) is described first.

The CIF may be included in a DCI format transmitted through a PDCCH or not. When the CIF is included in the DCI format, this represents that cross carrier scheduling is applied. When cross carrier scheduling is not applied, downlink scheduling allocation information is valid on a DL CC currently carrying the downlink scheduling allocation information. Uplink scheduling grant is valid on a UL CC linked with a DL CC carrying downlink scheduling allocation information.

When cross carrier scheduling is applied, the CIF indicates a CC associated with downlink scheduling allocation information transmitted on a DL CC through a PDCCH. For example, referring to FIG. 6, downlink allocation information for DL CC B and DL CC C, that is, information about PDSCH resources is transmitted through a PDCCH in a control region of DL CC A. A UE can recognize PDSCH resource regions and the corresponding CCs through the CIF by monitoring DL CC A.

Whether or not the CIF is included in a PDCCH may be semi-statically set and UE-specifically enabled according to higher layer signaling. When the CIF is disabled, a PDCCH on a specific DL CC may allocate a PDSCH resource on the same DL CC and assign a PUSCH resource on a UL CC linked with the specific DL CC. In this case, the same coding scheme, CCE based resource mapping and DCI formats as those used for the conventional PDCCH structure are applicable.

When the CIF is enabled, a PDCCH on a specific DL CC may allocate a PDSCH/PUSCH resource on a DL/UL CC indicated by the CIF from among aggregated CCs. In this case, the CIF can be additionally defined in existing PDCCH DCI formats. The CIF may be defined as a field having a fixed length of 3 bits, or a CIF position may be fixed irrespective of DCI format size. In this case, the same coding scheme, CCE based resource mapping and DCI formats as those used for the conventional PDCCH structure are applicable.

Even when the CIF is present, an eNB can allocate a DL CC set through which a PDCCH is monitored. Accordingly, blinding decoding overhead of a UE can be reduced. A PDCCH monitoring CC set is part of aggregated DL CCs and a UE can perform PDCCH detection/decoding in the CC set only. That is, the eNB can transmit the PDCCH only on the PDCCH monitoring CC set in order to schedule a PDSCH/PUSCH for the UE. The PDCCH monitoring DL CC set may be configured UE-specifically, UE group-specifically or cell-specifically. For example, when 3 DL CCs are aggregated as shown in FIG. 6, DL CC A can be configured as a PDCCH monitoring DL CC. When the CIF is disabled, a PDCCH on each DL CC can schedule only the PDSCH on DL CC A. When the CIF is enabled, the PDCCH on DL CC A can schedule PDSCHs in other DL CCs as well as the PDSCH in DL CC A. When DL CC A is set as a PDCCH monitoring CC, DL CC B and DL CC C do not transmit PDSCHs.

In a system to which the aforementioned CA is applied, a UE can receive a plurality of PDSCHs through a plurality of downlink carriers. In this case, the UE should transmit ACK/NACK for data on a UL CC in a subframe. When a plurality of ACK/NACK signals is transmitted in a subframe using PUCCH format 1a/1b, high transmit power is needed, a PAPR of uplink transmission increases and a transmission distance of the UE from the eNB may decrease due to inefficient use of a transmit power amplifier: To transmit a plurality of ACK/NACK signals through a PUCCH, ACK/NACK bundling or ACK/NACK multiplexing may be employed.

There may be generated a case in which ACK/NACK information for a large amount of downlink data according to application of CA and/or a large amount of downlink data transmitted in a plurality of DL subframes in a TDD system needs to be transmitted through a PUCCH in a subframe. In this case, the ACK/NACK information cannot be successfully transmitted using the above mentioned ACK/NACK bundling or multiplexing when the number of ACK/NACK bits to be transmitted is greater than the number of ACK/NACK bits that can be supported by ACK/NACK bundling or multiplexing.

An almost blank subframe (ABS) is a scheme for performing transmission according to a predetermined time pattern in order to mitigate interference between neighboring cells (or eNBs). According to the ABS based scheme, an aggressor cell, which may cause interference in communication of neighboring cells, can previously transmit an ABS pattern corresponding to a transmission pattern thereof to victim cells, the victim cells can mitigate interference from the aggressor cell by actively using subframes designated as ABSs by the aggressor cell for communication with UEs linked thereto, and cell detection performance and cell maintenance performance of the UEs linked to the victim cells can be improved.

The ABS will now be described in more detail.

A description will be given of ABS related signaling through an X2 interface used for communication between eNBs. To make good use of the ABS, an eNB sets restricted measurement for a UE and transmits two different ABS based measurement sets to the UE for restricted measurement. That is, upon reception of an ABS pattern of a neighboring cell, particularly, an aggressor cell through the X2 interface, the eNB configures measurement sets for the UE linked thereto on the basis of an ABS pattern thereof. In 3GPP LTE, a UE needs to measure a CRS in all subframes in order to select an MCS, RI and PMI. However, when the neighboring cell sets an ABS and does not transmit a downlink signal or transmits the downlink signal with reduced power in the corresponding subframe, as described above, the UE needs to perform subframe-specific measurement since interference depends on the ABS pattern. To achieve this, the eNB instructs a specific UE to measure a specific subframe and the UE performs subframe-specific measurement. This is called restricted measurement. For this operation, when a specific cell sets some subframes as ABSs, corresponding information needs to be transmitted through X2 interface between eNBs. ABS signaling defined in 3GPP LTE-A includes ABS information and ABS state.

The ABS information is shown in FIG. 3. The ABS information represents a subframe to be used as an ABS as a bitmap and corresponds to a 40-bit bitmap in FDD and a maximum 70-bit bitmap depending on UL-DL configuration in TDD. In the case of FDD, 40 bits represent 40 subframes, a bit value 1 indicates an ABS and 0 indicates a non-ABS. When restricted measurement is set for a UE, the number of CRS antenna ports of a corresponding cell is signaled to the UE for CRS measurement. A measurement subset is a subset of ABS Pattern Info and corresponds to a recommended kind of, restricted measurement set for setting restricted measurement for a UE. The measurement subset is represented as a 40-bit bitmap in FDD and as a maximum 70-bit bitmap in TDD.

TABLE 3

| IE/Group Name | Presence | Range | IE type and reference | Semantics description |
|---|---|---|---|---|
| CHOICE ABS Information | M | — | — | |
| >FDD | | | — | — |
| >>ABS Pattern Info | M | | BIT STRING (SIZE(40)) | Each position in the bitmap represents a DL subframe, for which "1" indicates 'ABS' and "0" indicates 'non-ABS'. The first position of the ABS pattern corresponds to subframe 0 in a radio frame where SFN = 0. The ABS pattern is continuously repeated in all radio frames. The maximum number of subframes is 40. |
| >>Number Of Cell-specific Antenna Ports | M | | ENUMERATED (1, 2, 4, . . .) | P (number of antenna ports for cell-specific reference signals) |
| >>Measurement Subset | M | | BIT STRING (SIZE(40)) | Indicates a subset of the ABS Pattern Info above, and is used to configure specific measurements towards the UE. |
| >TDD | | | — | — |
| >>ABS Pattern Info | M | | BIT STRING (1 . . . 70, . . .) | Each position in the bitmap represents a DL subframe for which "1" indicates 'ABS' and "0" indicates 'non-ABS'. The maximum number of subframes depends on UL/DL subframe configuration. The maximum number of subframes is 20 for UL/DL subframe configurations 1~5; 60 for UL/DL subframe configuration 6; 70 for UL/DL subframe configuration 0. The first position of the ABS pattern corresponds to subframe 0 in a radio frame where SFN = 0. The ABS pattern is continuously repeated in all radio frames, and restarted each time SFN = 0. |
| >>Number Of Cell-specific Antenna Ports | M | | ENUMERATED (1, 2, 4, . . .) | P (number of antenna ports for cell-specific reference signals) |
| >>Measurement Subset | M | | BIT STRING (1 . . . 70, . . .) | Indicates a subset of the ABS Pattern Info above, and is used to configure specific measurements towards the UE |

TABLE 3-continued

| IE/Group Name | Presence | Range | IE type and reference | Semantics description |
|---|---|---|---|---|
| >ABS Inactive | M | | NULL | Indicates that interference coordination by means of almost blank sub frames is not active |

Table 4 shows ABS status IE. The ABS status IE is used to assist an eNB in determining whether or not to change the ABS pattern thereof. Usable ABS Pattern Info is bitmap information corresponding to a subset of ABS Pattern Info and indicates whether a subframe designated as an ABS has been successfully used for interference control or not. DL ABS status represents the ratio of the number of RBs allocated to a UE, which need to be protected through an ABS, to the number of DL RBs scheduled in a subframe indicated by Usable ABS Pattern Info and corresponds to information indicating whether the ABS has been successfully used for the purpose thereof in a victim cell.

TABLE 4

| IE/Group Name | Presence | Range | IE type and reference | Semantics description |
|---|---|---|---|---|
| DL ABS status | M | | INTEGER (0 . . . 100) | Percentage of used ABS resources. The numerator of the percentage calculation consists of resource blocks within the ABS indicated in the Usable ABS Pattern Info IE allocated by the eNB2 for UEs needing protection by ABS from inter-cell interference for DL scheduling, or allocated by the eNB2 for other reasons (e.g. some control channels). The denominator of the percentage calculation is the total quantity of resource blocks within the ABS indicated in the Usable ABS Pattern Info IE. |
| CHOICE Usable ABS Information | M | | — | — |
| >FDD | | | — | — |
| >>Usable ABS Pattern Info | M | | BIT STRING (SIZE(40)) | Each position in the bitmap represents a subframe, for which "1" indicates 'ABS that has been designated as protected from inter-cell interference by the eNB1, and available to serve this purpose for DL scheduling in the eNB2' and "0" is used for all other subframes. The pattern represented by the bitmap is a subset of, or the same as, the corresponding ABS Pattern Info IE conveyed in the LOAD IINFORMATION message from the eNB1. |
| >TDD | | | — | — |
| >>Usable ABS Pattern Info | M | | BIT STRING (1 . . . 70) | Each position in the bitmap represents a subframe, for which "1" indicates 'ABS that has been designated as protected from inter-cell interference by the eNB1, and available to serve this purpose for DL scheduling in the eNB2' and "0" is used for all other subframes. The pattern represented by the bitmap is a subset of, or the same as, the corresponding ABS Pattern |

TABLE 4-continued

| IE/Group Name | Presence | Range | IE type and reference | Semantics description |
|---|---|---|---|---|
| | | | | Info IE conveyed in the LOAD INFORMATION message from the eNB1. |

As described above, a measurement subset corresponding to a subset of an ABS pattern is a subframe statically used as an ABS and an eNB can determine whether other subframes included in the ABS pattern can be used as ABSs according to traffic load.

The following table shows invoke an indication IE. Invoke indication can be used when a specific eNB requests information of a specific type from a neighboring eNB. When the neighboring eNB performs ABS operation, invoke information can be used to request the neighboring eNB to provide ABS information on an ABS pattern set therefor.

TABLE 5

| IE/Group Name | Presence | Range | IE type and reference | Semantics description |
|---|---|---|---|---|
| Invoke Indication | M | | ENUMERATED (ABS Information, . . .) | — |

As described above, when a plurality of cells in an interfering relationship predetermines transmission patterns thereof through co-scheduling, a UE located at a position where the UE can communicate with all the cells can communicate with a specific cell at the time when the specific cell can perform transmission and reception. Accordingly, the UE can achieve communication with the plurality of cells by arranging transmission/reception times thereof according to the transmission patterns of the cells. Here, the UE can perform communication with the plurality of cells by pre-establishing connection with the cells such that transmission/reception times with respect to the cells do not overlap.

The above-described ABS is a solution to inter-cell interference, which is applicable in the time domain. A description will be given of a solution to inter-cell interference, which can be applied in the frequency domain as well as the time domain.

Inter-cell interference coordination for frequency resources will be described hereinafter. In 3GPP LTE (Rel-8), an allocated frequency domain can be divided into one or more sub-frequency domains (e.g. PRBs) and the following indicators with respect to each sub-frequency domain can be exchanged between cells.

RNTP (relative narrowband transmission power): RNTP is an indicator that indicates downlink transmit power used by a cell transmitting an ICIC message in a corresponding sub-frequency domain. For example, when the RNTP field is set to 0 in a specific sub-frequency domain, this means that downlink transmit power does not exceed a threshold. When the RNTP field is set to 1, this means that downlink transmit power cannot be allotted.

UL IOI (uplink interference overload indication): UL IOI is an indicator that indicates the quantity of uplink interference that a cell transmitting an ICIC message suffers in a corresponding sub-frequency domain. For example, when the UL IOI field is set to a high value in a specific sub-frequency domain, this means that the cell suffers severe uplink interference in the sub-frequency domain. In this case, a cell that has received the ICIC message can schedule a UE using low uplink transmit power from among UEs served thereby in the sub-frequency domain in which the UL IOI field indicates high interference in order to mitigate interference applied to the cell transmitting the ICIC message.

UL HII (uplink high interference indication): UL HII is an indicator that indicates uplink interference sensitivity with respect to a corresponding sub-frequency domain from a cell transmitting an ICIC message. For example, when the UL HII field is set to 1 in a specific sub-frequency domain, this means that there is possibility that the cell transmitting the ICIC message schedules a UE using high uplink transmit power in the corresponding sub-frequency domain. On the contrary, if the UL HII field is set to 0 in a specific sub-frequency domain, this means that there is possibility that the cell transmitting the ICIC message schedules a UE using low uplink transmit power in the corresponding sub-frequency domain. In this case, a cell that has received the ICIC message can schedule UEs that can successfully operate even under high interference in a sub-frequency domain in which UL HII is set to 1 while preferentially using a sub-frequency domain in which UL HII is set to 0 for UE scheduling in order to avoid interference from the cell transmitting the ICIC message.

In 3GPP LTE, eNBs may operate and manage a plurality of carriers through carrier aggregation (CA). In this case, each eNB does not always use all available carriers as operation carriers for actual UE communication in the corresponding cell, and may selectively activate/deactivate necessary carriers according to traffic load or a channel state needed for the corresponding cell. In 3GPP LTE, when cells configured to perform downlink (DL) transmission with various transmit (Tx) powers are distributed, a method for reducing interference caused by differences in Tx powers is being intensively discussed. In this case, when cells configured to perform DL transmission at various Tx powers are distributed throughout the entire network, this network is referred to as a Heterogeneous Network (HetNet). In a HetNet, a plurality of small cells may operate in 3GPP LTE, and the corresponding small cells can more dynamically perform modification of the operation carriers through carrier activation/deactivation due to UE access or traffic load modification.

In the present invention, the aforementioned small-cell operation in which small cells may select/activate an operational carrier from among available carriers is defined as Operational Carrier Selection (OCS), and carriers capable of being used as the operational carriers by a specific small cell are defined as candidate carriers.

Assuming that a specific small cell additionally uses a specific carrier as the operation carrier through OCS, interference may be applied to a neighbor cell configured to use the same frequency band as the corresponding carrier. For the above mentioned reason, selecting a carrier that causes minimizes interference to neighbor cells, from among candidate carriers capable of being used by the corresponding small cell is of importance. For this purpose, it is necessary for the small cell to measure interference caused by activation of candidate carriers before activation of a specific carrier.

In order to measure interference generated when activation of a specific carrier caused by OCS of the small cell is applied to neighbor cells, the corresponding small cell may transmit a dummy signal or data through candidate carriers during a predetermined time.

The dummy signal or data is not meaningful to the UE, and may indicate a signal that is transmitted with a Tx power considering transmission of actual data to a frequency band of a candidate carrier to be activated by the small cell. In this case, UEs of a neighbor cell employing a carrier through which the dummy signal or data is transmitted may measure an interference signal including the corresponding dummy signal or data, such that the UEs may measure the degree of interference generated in activation of the corresponding carrier. However, assuming that strong interference occurs in the neighbor cell due to transmission of the dummy signal or data, there may arise some problems in communication of UEs served by the neighbor cell due to a Radio Link Failure (RLF). In order to solve the above mentioned problem, it is necessary to coordinate transmission of the dummy signal or data between the small cell scheduled to transmit the dummy signal or data and the neighbor cells of the small cells.

In order to solve the above mentioned problems, when the small cell transmits the dummy signal or data so as to measure the degree of interference generated in the neighbor cell during carrier activation, the small cell transmits the corresponding dummy signal or data as a pattern predetermined between cells, a UE served by the neighbor cell may measure only interference generated by the dummy signal or data within only a subframe in which the dummy signal or data is transmitted, and performs a general operation in the remaining subframes other than the above subframe, such that the UE served by the neighbor cell can minimize influence of current communication.

Figure 7:
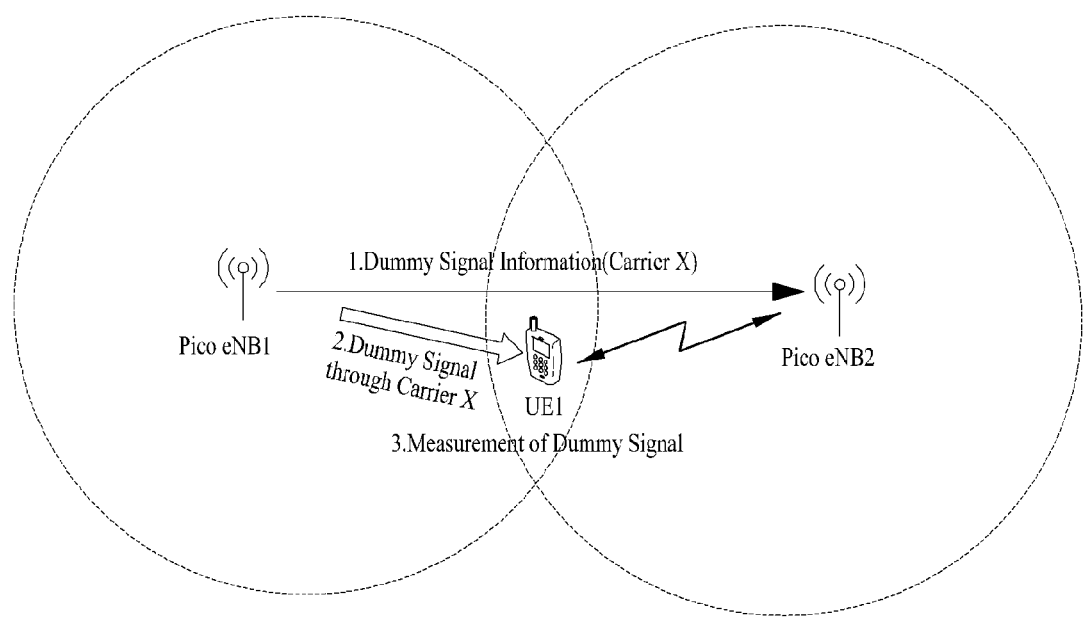
FIG. 7 is a conceptual diagram illustrating transmission of a dummy signal (or data) through a candidate carrier during an OCS operation of a small cell according to an embodiment of the present invention.

FIG. 7 is a conceptual diagram illustrating transmission of a dummy signal (or data) through a candidate carrier during an OCS operation of a small cell according to an embodiment of the present invention. That is, when a pico eNB1 serving as a small cell additionally aims to measure influence of a neighbor cell affected by activation of a carrier (X), the pico eNB1 may transmit dummy signal information to a neighbor cell (Pico eNB2). The dummy signal information may indicate when each radio resource will be used for transmission of the dummy signal or data and/or when the radio resource will be used for transmission of the dummy signal or data. The pico eNB2 having received the dummy signal information from the pico eNB1 may enable a UE1 connected to the pico eNB1 to measure an interference signal including the dummy signal when the dummy signal is transmitted from the pico eNB1, such that the pico eNB2 may measure an interference amount generated when the pico eNB1 uses the above carrier X.

A) Definition of Dummy Signal Transmission Pattern for Measuring Influence Generated from Specific-Carrier Operation/Management Applied to Neighbor Cell In order to measure influence of specific-carrier activation caused by the OCS operation of a small cell with respect to a neighbor cell according to one embodiment, a dummy signal pattern is defined, so that the small cell configured to perform the OCS operation can transmit information of the corresponding dummy signal pattern (i.e., dummy signal pattern) to the neighbor cell to which interference caused by the corresponding carrier activation will be applied.

In 3GPP LTE, the eNB (or BS) configured to cause interference to a peripheral part using time-domain inter-cell interference coordination (ICIC) may not transmit data to a subframe assigned to a specific time pattern, or Almost Blank Subframe (ABS) configured to transmit data or information at lower Tx power than general transmission is defined. Since a macro cell acting as an aggressor cell causing interference may not transmit data or information or may transmit data or information at lower Tx power, the ABS may communicate with the UE in consideration of victim small cells located in coverage of the corresponding macro cell under a lower interference level for the ABS as compared to the non-ABS. For the above reason, the small cell may use a subframe assigned to an ABS of the macro cell as a protected subframe, or may use a subframe assigned to a non-ABS of the macro cell as a non-protected subframe. The victim small cells may provide UEs located at an outer side of the center part of the cell within the protected subframe, as compared to cell coverage of the non-protected subframe. In 3GPP LTE, the above mentioned scheme is referred to as Cell Range Extension (CRE), and a UE connected according to the above mentioned scheme is referred to as a CRE UE.

Therefore, when the small cell desires to measure influence of neighbor cells caused by activation of a candidate carrier, there is a need to measure an interference amount of the neighbor cells per subframe aggregate. More particularly, there is a need to measure not only influence of a CRE UE configured to receive a downlink signal through the protected subframe aggregate, but also influence of each non-CRE UE configured to receive a downlink signal in the non-protected subframe aggregate. Since CRE UEs are located at an outer side of the center point of the serving cell as compared to a general cell coverage, the intensity of a DL signal received from the serving cell is relatively low, such that each CRE UE may have higher interference influence than the non-CRE UE.

For the above reason, during transmission of a dummy signal (or data) of a small cell configured to perform the OCS operation, the small cell needs to transmit a dummy signal in consideration of an ABS operation (i.e., ABS pattern) of a macro cell to which the small cell pertains. That is, when the small cell performing the OCS operation defines a time-domain transmission pattern of the dummy signal to be transmitted through n candidate carrier, there is a need to consider the ABS pattern of the macro cell. In addition, when the small cell schedules a dummy signal transmission pattern for transmitting the dummy signal of the small cell configured to perform the OCS operation considering the ABS operation of the macro cell, the dummy signal is transmitted not only in the protected subframe but also in the non-protected subframe, there is a need to report influence of a neighbor cell upon a non-CRE UE and influence of the neighbor cell upon a CRE UE. In addition, CRE UEs may be easily affected by interference of the neighbor cell, and a sufficient number of dummy signals are transmitted to the protected subframe in which CRE UEs may be mainly scheduled, such that it is necessary to increase measurement accuracy of interference applied to the CRE UE connected to the neighbor cell due to activation of the corresponding carrier.

Considering the above mentioned factors, transmission of a dummy signal applied to candidate carriers during activation of an additional carrier of a specific small cell may be represented by the following two schemes.

A first dummy signal transmission scheme is designed to represent a transmission pattern of the dummy signal using a bitmap format. In the corresponding bitmap, each bit may designate a subframe or a specific time duration. In addition, in order to decide a time duration in which the dummy signal is transmitted using the transmission pattern of the corresponding dummy signal, the dummy signal may be transmitted along with a start time at which transmission of the dummy signal starts and an end time at which transmission of the dummy signal is ended. The start time and the end time may be represented by a System Frame Number (SFN) indicating a specific radio frame and specific information indicating which one of subframes (#0~#9) is used in the corresponding radio frame. The corresponding small cell may repeatedly transmit the dummy signal according to the dummy signal transmission pattern during the start time and the end time.

The first dummy signal transmission scheme has advantages in that the dummy signal transmission pattern of a specific period can be freely scheduled in units of a predetermined time (e.g., subframe).

The second dummy signal transmission scheme may designate transmission of a dummy signal at intervals of a predetermined time within a predetermined duration. That is, the second dummy signal transmission scheme may decide how many subframes starting from the n-th subframe of a radio frame of a specific SFN will be used as a transmission period of one dummy signal. In accordance with the second dummy signal transmission scheme, during the ABS operation of a macro cell in which a small cell configured to perform a new OCS operation and peripheral small cells are located, the corresponding small cell may transmit the dummy signal in different ways according to the protected subframe and the non-protected subframe. For example, in the case of the protected subframe, the dummy signal is transmitted at intervals of three subframes. In the case of the protected subframe, the dummy signal may be transmitted at intervals of two subframes so as to more accurately measure influence of a CRE UE.

Assuming that the small cell configured to perform the OCS operation transmits a transmission pattern of the dummy signal scheduled by the above scheme to neighbor cells, the neighbor cells may discriminate between UE interference obtained through a dummy signal within the protected subframe and UE interference obtained through a dummy signal within the non-protected subframe, and may measure the two UE interferences. Accordingly, among UEs connected to the neighbor cells of the small cell having transmitted the dummy signal, influence of a CRE UE and influence of a non-CRE UE may be distinguished from each other, such that the non-CRE UE influence and the non-CRE UE influence may be measured. The neighbor cell may transmit the measurement result to the small cell in such a manner that the measurement result may be considered by the small cell configured to decide activation or deactivation of a specific candidate carrier.

The dummy signal transmission pattern is independently assigned to each of candidate carriers through which the corresponding small cell is ready to measure influence of a neighbor cell, such that the resultant dummy signal transmission pattern may be transferred as a plurality of pattern information to the neighbor cell. In this case, in order to determine which carrier is associated with a pattern of the dummy signal, a carrier identifier (ID) of a carrier through which the dummy signal will be transmitted may be contained in the dummy signal pattern information of each candidate carrier.

FIG. 8 is a conceptual diagram illustrating a transmission pattern of a dummy signal according to an embodiment of the present invention. In more detail, when the small cell is scheduled to activate a new operational carrier, a method for defining the dummy signal transmission pattern indicating which subframe will be used for dummy signal transmission according to the bitmap format is shown in FIG. 8. The corresponding small cell may transmit the dummy signal transmission pattern shown in FIG. 8 to the neighbor cell using a binary value '0100100001' indicating bitmap information, such that it can indicate which subframe will be used for dummy signal transmission.

FIG. 9 is a conceptual diagram illustrating a transmission pattern of a dummy signal according to an aggregate of subframes according to an embodiment of the present invention. In more detail, when a small cell is ready to activate a new operation carrier, the dummy signal transmission pattern indicating which subframe will be used for dummy signal transmission can be provided as periodic information. In this case, assuming that there is a need to consider the ABS operation of the macro cell including the small cells as described above, the small cell performing the OCS operation may classify a transmission period of the dummy signal into a plurality of transmission periods according to subframe types, and may provide the classified result. That is, according to whether the ABS operation of the macro cell is operated, a dummy signal transmission period of the protected subframe corresponding to the subframe type and a dummy signal transmission period of the non-protected subframe may be transmitted to the neighbor cells, respectively. Through the aforementioned operation, the neighbor cells may recognize which subframe of each of the protected subframe and the non-protected subframe is used for transmission of the dummy signal.

In FIG. 9, control information in which the dummy signal transmission pattern is denoted by "Period at protected subframe=2, Period at non-protected subframe=3" may be transmitted to the neighbor cells. That is, one dummy signal can be transmitted at intervals of two subframes within the protected subframe (i.e., a specific subframe assigned to an ABS of a macro cell) through transmission of the control information; and one dummy signal can be transmitted at intervals of three subframes within the non-protected subframe (i.e., a (general) subframe not assigned to the ABS of the macro cell) through transmission of the control information. The above mentioned information may be transferred to the neighbor cells. Preferably, the dummy signal may be more frequently transmitted in the protected subframe, than the non-protected subframe. As previously stated above, although the above mentioned operation is used to measure and/or observe interference influence upon a CRE UE, the detailed period or the number of operations shown in FIG. 9 is not limited thereto.

Meanwhile, in the same manner as in the above method for defining the dummy signal transmission pattern using the bitmap format, information of start and end times at which the above information will be applied may be simultaneously provided. Alternatively, the example of FIG. 9 considers the ABS pattern of the macro cell, synchronizing the control information with the ABS pattern of the macro cell may be promised in advance. Therefore, the above mentioned control information may be used within a subframe period indicated by a bitmap of the ABS pattern of the macro cell.

On the contrary, when the dummy signal is transmitted from a small cell performing the OCS operation to the neighbor cell according to the defined dummy signal information (i.e., a transmission pattern of the dummy signal, etc.), a specific radio resource instead of the entire radio resource of the corresponding subframe is designated so that the dummy signal can be transmitted using the specific radio resource. The specific radio resource for transmission of the dummy signal may be predetermined through inter-cell coordination, and a resource element (RE) to be used for dummy signal transmission can be arranged in time and frequency domains from among radio resources of the entire subframe in such a manner that the neighbor cells can measure the above dummy signal.

The neighbor cell may be scheduled to transmit the dummy signal to UEs served by the neighbor cell on the basis of the dummy signal information. In addition, the neighbor cell may transmit the measurement result of the dummy signal to the cell having transmitted the dummy signal, or may transmit a dummy signal measurement report based on the measurement result of the dummy signal to the cell having transmitted the dummy signal.

Upon receiving the measurement result or the measurement report, the cell having transmitted the dummy signal may decide whether activation of the candidate carrier is appropriate.

For example, assuming that the above mentioned operations for a plurality of candidate carriers are carried out, a specific candidate carrier causing the smallest interference may be decided according to the measurement result or measurement report received from the neighbor cell, or the calculated carrier may be activated according to the above measurement result or the above measurement report.

Alternatively, assuming that a specific value of the measurement result or a specific value of the measurement report is lower than a predetermined threshold value (that is, if interference amount is relatively small), the cell having transmitted the dummy signal may activate the above carrier.

B) State Reflection of Neighbor Cell UE when Interference Amount for Dummy Signal Transmission is Measured.

When a dummy signal is transmitted through a new carrier to be activated by a small cell, there is a need to consider the carrier aggregation (CA) situation of the neighbor cell UE. That is, among the neighbor cell UEs, influence upon one UE that assigns a candidate carrier for transmission of the dummy signal to a primary cell (PCell) must be distinguished from another UE that assigns the candidate carrier to a secondary cell (SCell), and the influences of individual UEs are then measured. In more detail, when basic control information and scheduling information are transmitted from the serving eNB to the UE through a carrier assigned to PCell from among multiple carriers used by a specific UE, and when an unexpected problem (i.e., interference caused by carrier activation) occurs in PCell, the UE may have difficulty in accessing the serving eNB.

For this purpose, the neighbor cell configured to receive dummy signal information from a small cell scheduled to activate a new specific carrier may first perform dummy signal measurement on each UE that assigns the specific carrier to a PCell from among UEs connected to the neighbor cell. The UEs configured to assign the specific carrier to SCell may selectively measure the dummy signal. In addition, the neighbor cell having received the dummy signal measurement result from its own UEs may feed back an interference variation value indicating the degree of influence of the measurement result upon the corresponding small cell having transmitted the dummy signal. In this case, the degree of interference received by a PCell UE may be weighted and transmitted as necessary.

In 3GPP LTE, a reception Signal-to-Interference plus Noise Ratio (SINR) of a UE may be used as specific information indicating an interference amount applied to the UE, and the UE may use a CQI index value indicating a quantization value of the SINR value such that the UE may report the SINR value to the serving eNB. In order to measure influence of a neighbor cell upon additional carrier activation of a small cell, influence of interference applied to the neighbor cell may be measured in consideration of a CQI index variation of the neighbor cell UE having received interference before/after transmission of the dummy signal.

A method for calculating an interference variation value ($V_s$) of the specific cell may be defined by the following equation 1. That is, an average value of a CQI index value variation of PCell UEs and a CQI index value variation of SCell UEs may be defined as an interference variation value. In this case, a weight (w) is applied to a variation of the PCell CQI value, such that interference variation of the PCell UE may be used as a principal interference variation factor of the corresponding cell.

$$V_s = \frac{w \cdot \sum_{k=1}^{n}(CQI_k^0 - CQI_k^1) + \sum_{l=1}^{m}(CQI_l^0 - CQI_l^1)}{n+m}$$ [Equation 1]

In Equation 1, 'n' is the number of UEs on the condition that a carrier through which the dummy signal is transmitted corresponds to a PCell, and 'm' is the number of UEs n the condition that a carrier aggregation through which the dummy signal is transmitted corresponds to an SCell. $CQI_k^0$ is a CQI index value reported to a serving eNB of a PCell UE before the PCell UE transmits the dummy signal, and $CQI_k^1$ is a CQI index value reported to the serving eNB after the PCell UE transmits the dummy signal. In addition, $CQI_l^0$ is a CQI index value reported to a serving eNB of the SCell UE before the SCell UE transmits the dummy signal, and $CQI_l^1$ is a CQI index value reported to the serving eNB after the SCell UE transmits the dummy signal. 'w' is a weight indicating a variation of interference received by the PCell UE. The weight (w) may be cell-specifically established by a management entity of the 3GPP LTE network, or may be network-specifically established for the network including several eNBs.

For example, before/after the dummy signal is transmitted from a small cell scheduled to newly activate a carrier, a CQI index value reported by a UE in which the carrier corresponds to PCell from among several UEs of the neighbor cell having received interference is changed from 8 to 5. Assuming that a CQI index value reported by a UE in which the carrier corresponds to SCell is changed from 8 to 4, if a weight of the PCell UE is set to 2, an interference variation value of the neighbor cell having received interference may be denoted by "((8−5)*2+8−4)/2=5" according to the above mentioned equation, the resultant interference variation value may be fed back to the above small cell having transmitted the dummy signal.

The above mentioned equation 1 may be used to weight an interference variation value of the PCell UE, and may apply a predetermined weight to a variation value of the CQI index value reported by a CRE UE compared to the non-CRE UE, such that the interference variation value of the CRE UE may also be used even when the interference variation value of the CRE UE is used as the principal interference variation factor of the corresponding cell. In this case, 'n' is the number of CRE UEs, and 'm' is the number of non-CRE UEs. In addition, $CQI_k^0$ is a CQI index value reported to a serving eNB of the CRE UE before the CRE UE transmits the dummy signal, and $CQI_k^1$ is a CQI index value reported to the serving eNB after the CRE UE transmits the dummy signal. $CQI_l^0$ is a CQI index value reported to the serving eNB before the non-CRE UE transmits the dummy signal, and $CQI_l^1$ is a CQI index value reported to the serving eNB after the non-CRE UE transmits the dummy signal. 'w' is a weight indicating a variation of interference received by the CRE UE.

Figure 10:
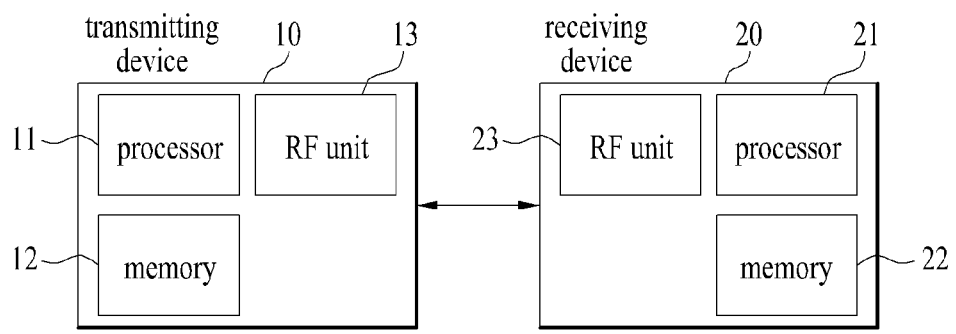
FIG. 10 is a block diagram illustrating a device for implementing embodiment(s) of the present invention.

FIG. 10 is a block diagram of a transmitting device 10 and a receiving device 20 configured to implement exemplary embodiments of the present invention. Referring to FIG. 10, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency downconverts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The present invention can be used for wireless communication systems such as a UE, a relay, an eNB, etc.

What is claimed is:

1. A method for measuring inter-cell interference due to activation of at least one candidate carrier by a first pico evolved Node B (eNB) in a wireless communication system, the method comprising:

receiving, by the first pico eNB from a neighbor pico eNB, transmission information of a dummy signal to be transmitted on at least one candidate carrier to be activated by the neighbor pico eNB, the transmission information including a transmission period of the dummy signal in a protected subframe set and a transmission period of the dummy signal in a non-protected subframe set;

scheduling, by the first pico eNB, at least one user equipment (UE) served by the first pico eNB to measure the dummy signal in subframes indicated by the transmission information;

receiving, by the first pico eNB from the at least one UE, a measurement value of the dummy signal for each of the protected subframe set and the non-protected subframe set; and transmitting, by the first pico eNB to the neighbor pico eNB, a measurement report of the dummy signal based on the measurement value, wherein the measurement report of the dummy signal is used by the neighbor pico eNB for inter-cell interference coordination between the first pico eNB and the neighbor pico eNB on the at least one candidate carrier, wherein the transmission period of the dummy signal transmitted in the protected subframe set is larger than the transmission period of the dummy signal transmitted in the non-protected subframe set, and wherein the transmission information includes an identifier (ID) of the at least one candidate carrier.

2. The method according to claim 1, wherein the protected subframe set corresponds to an Almost Blank Subframe (ABS) subframe set and the non-protected subframe set corresponds to a non-ABS subframe set.

3. The method according to claim 1, wherein the transmission information is determined based on an Almost Blank Subframe (ABS) pattern of a macro eNB which the neighbor pico eNB is associated with.

4. The method according to claim 1,
wherein the transmission period is represented by a number of subframes.

5. The method according to claim 1, wherein the measurement report includes an interference variation value obtained before and after transmission of the dummy signal measured by the at least one UE.

6. The method according to claim 5, wherein the interference variation value is represented by an equation $$\frac{w \cdot \sum_{k=1}^{n}(CQI_k^0 - CQI_k^1) + \sum_{l=1}^{m}(CQI_l^0 - CQI_l^1)}{n+m},$$

where n is a number of Cell Range Extension (CRE) UEs connected to the first pico eNB according to a CRE scheme through an Almost Blank Subframe (ABS), m is a number of non-CRE UEs connected to the first pico eNB according to a general scheme instead of the CRE scheme, $CQI_k^0$ is a channel quality indicator (CQI) index value reported by a CRE UE k to the pico eNB before the dummy signal is transmitted, $CQI_k^1$ is a CQI index value reported by the CRE UE k to the first pico eNB after the dummy signal is transmitted, $CQI_l^0$ is a CQI index value reported by a non-CRE UE l to the first pico eNB before the dummy signal is transmitted, $CQI_l^1$ is a CQI index value reported by the non-CRE UE l to the first pico eNB after the dummy signal is transmitted, and w is a weight.

7. The method according to claim 5, wherein the interference variation value is represented by an equation $$\frac{w \cdot \sum_{k=1}^{n}(CQI_k^0 - CQI_k^1) + \sum_{l=1}^{m}(CQI_l^0 - CQI_l^1)}{n+m},$$

where n is a number of primary cell (PCell) UEs by which the at least one carrier is configured to a PCell, m is a number of secondary cell (SCell) UEs by which the at least one carrier is configured to an SCell, $CQI_k^0$ is a channel quality indicator (CQI) index value reported by a PCell UE k to the first pico eNB before the dummy signal is transmitted, $CQI_k^1$ is a CQI index value reported by the PCell UE k to the first pico eNB after the dummy signal is transmitted, $CQI_l^0$ is a CQI index value reported by an SCell UE l to the first pico eNB before the dummy signal is transmitted, $CQI_l^1$ s a CQI index value reported by the SCell UE l to the first pico eNB after the dummy signal is transmitted, and w is a weight.

8. A method for measuring inter-cell interference due to activation of at least one candidate carrier by a first pico evolved Node B (eNB) in a wireless communication system, the method comprising:

transmitting, by the first pico eNB to a neighbor pico eNB, transmission information of a dummy signal to be transmitted on at least one candidate carrier to be activated by the first pico eNB, the transmission information including a transmission period of the dummy signal in a protected subframe set and a transmission period of the dummy signal in a non-protected subframe set;

transmitting, by the first pico eNB, the dummy signal according to the transmission information, wherein the dummy signal is measured by at least one user equipment (UE) served by the neighbor pico eNB;

receiving, by the first pico eNB from the neighbor pico eNB, a measurement report of the dummy signal for each of the protected subframe set and the non-protected subframe set; and determining, by the first pico eNB, whether to activate the at least one candidate carrier based on the measurement report of the dummy signal, wherein the measurement report of the dummy signal is used by the first pico eNB for inter-cell interference coordination between the first pico eNB and the neighbor pico eNB on the at least one candidate carrier, wherein the transmission period of the dummy signal transmitted in the protected subframe set is larger than the transmission period of the dummy signal transmitted in the non-protected subframe set, and wherein the transmission information includes an identifier (ID) of the at least one candidate carrier.

9. The method according to claim 8, wherein the protected subframe set corresponds to an Almost Blank Subframe (ABS) subframe set and the non-protected subframe set corresponds to a non-ABS subframe set.

10. The method according to claim 8, wherein the transmission information is determined based on an Almost Blank Subframe (ABS) pattern of a macro eNB which the neighbor pico eNB is associated with.

11. The method according to claim 8,
wherein the transmission period is represented by a number of subframes.

12. The method according to claim 8, wherein the measurement report of the dummy signal includes an interference variation value obtained before and after transmission of the dummy signal measured by at least one UE connected to the neighbor pico eNB.

13. The method according to claim 12, wherein the interference variation value is represented by an equation $$\frac{w \cdot \sum_{k=1}^{n}(CQI_k^0 - CQI_k^1) + \sum_{l=1}^{m}(CQI_l^0 - CQI_l^1)}{n+m},$$

where n is a number of Cell Range Extension (CRE) UEs connected to the neighbor pico eNB according to a CRE scheme through an Almost Blank Subframe (ABS), m is a number of non-CRE UEs connected to the neighbor pico eNB according to a general scheme instead of the CRE scheme, $CQI_k^0$ is a channel quality indicator (CQI) index value reported by a CRE UE k to the neighbor pico eNB before the dummy signal is transmitted, $CQI_k^1$ is a CQI index value reported by the CRE UE k to the neighbor pico eNB after the dummy signal is transmitted, $CQI_l^0$ is a CQI index value reported by a non-CRE UE l to the neighbor pico eNB before the dummy signal is transmitted, $CQI_l^1$ is a CQI index value reported by the non-CRE UE l to the neighbor pico eNB after the dummy signal is transmitted, and w is a weight.

14. The method according to claim 12, wherein the interference variation value is represented by an equation $$\frac{w \cdot \sum_{k=1}^{n}(CQI_k^0 - CQI_k^1) + \sum_{l=1}^{m}(CQI_l^0 - CQI_l^1)}{n+m},$$

where n is a number of primary cell (PCell) UEs by which the at least one carrier is configured to a PCell, m is a number of secondary cell (SCell) UEs by which the at least one carrier is configured to an S Cell, $CQI_k^0$ is a CQI index value reported by an PCell UE k to the neighbor pico eNB before the dummy signal is transmitted, $CQI_k^1$ is a channel quality indicator (CQI) index value reported by the PCell UE k to the neighbor pico eNB after the dummy signal is transmitted, $CQI_l^0$ is a CQI index value reported by an SCell UE l to the neighbor pico eNB before the dummy signal is transmitted, $CQI_l^1$ is a CQI index value reported by the SCell UE l to the neighbor pico eNB after the dummy signal is transmitted, and w is a weight.

\* \* \* \* \*